US012791350B2

(12) United States Patent
Onica et al.

(10) Patent No.: US 12,791,350 B2
(45) Date of Patent: Nov. 10, 2026

(54) METHOD FOR ASSISTING IN THE CREATION OF AN ELEVATION MAP

(71) Applicant: Robert Bosch GmbH, Stuttgart (DE)

(72) Inventors: Dan-Teodor Onica, Cluj-Napoca (RO); Mihai Barbulescu, Cluj-Napoca (RO)

(73) Assignee: ROBERT BOSCH GMBH, Stuttgart (DE)

( * ) Notice: Subject to any disclaimer, the term of this patent is extended or adjusted under 35 U.S.C. 154(b) by 39 days.

(21) Appl. No.: 18/898,808

(22) Filed: Sep. 27, 2024

(65) Prior Publication Data

US 2025/0130065 A1 Apr. 24, 2025

(30) Foreign Application Priority Data

Oct. 18, 2023 (DE) ..................... 10 2023 210 175.0

(51) Int. Cl.
*G01C 21/00* (2006.01)
*G06V 20/56* (2022.01)

(52) U.S. Cl.
CPC ..... *G01C 21/3826* (2020.08); *G01C 21/3837* (2020.08); *G06V 20/56* (2022.01)

(58) Field of Classification Search
CPC ............ G01C 21/3826; G01C 21/3837; G01C 21/3811; G01C 21/3841; G01C 21/3848; G01C 21/32; G06V 20/56; G09B 29/005; G09B 29/12
See application file for complete search history.

(56) References Cited

U.S. PATENT DOCUMENTS

| | | | |
|---|---|---|---|
| 8,825,391 B1 | 9/2014 | Urmson et al. | |
| 11,067,994 B2 | 7/2021 | Borgstadt | |
| 2019/0226853 A1* | 7/2019 | Kubiak | G06V 20/56 |
| 2021/0318444 A1* | 10/2021 | Li | G01S 13/428 |
| 2022/0236073 A1* | 7/2022 | Homann | G01C 21/32 |

FOREIGN PATENT DOCUMENTS

| | | | |
|---|---|---|---|
| DE | 102019208384 | A1 | 12/2020 |
| DE | 102021115630 | A1 | 12/2021 |
| JP | 2018194417 | A | 12/2018 |
| WO | 2023067385 | A2 | 4/2023 |

OTHER PUBLICATIONS

Cuemath, Angle of Elevation, Mar. 25, 2023, Cuemath.com (Year: 2023).*

* cited by examiner

*Primary Examiner* — Aniss Chad
*Assistant Examiner* — Chase L Cooley
(74) *Attorney, Agent, or Firm* — NORTON ROSE FULBRIGHT US LLP

(57) ABSTRACT

A method for assisting in the creation of an elevation map. The method includes: detecting a surroundings of a land vehicle, in particular a motor vehicle or rail vehicle, and ascertaining image data based on the detection by means of a camera of a land vehicle; ascertaining an elevation of a location in the surroundings of the land vehicle relative to a reference location based on the image data; sending the ascertained elevation of the location via a communication network to a remote map server, in order to assist it in the creation of the elevation map. An apparatus for assisting in the creation of an elevation map, a land vehicle, a map server for creating an elevation map, a method for creating an elevation map, a computer program, and a machine-readable storage medium are also described.

11 Claims, 8 Drawing Sheets

METHOD FOR ASSISTING IN THE CREATION OF AN ELEVATION MAP

CROSS REFERENCE

The present application claims the benefit under 35 U.S.C. § 119 of German Patent Application No. DE 10 2023 210 175.0 filed on Oct. 18, 2023, which is expressly incorporated herein by reference in its entirety.

FIELD

The present invention relates to a method for assisting in the creation of an elevation map, an apparatus for assisting in the creation of an elevation map, a land vehicle, a map server for creating an elevation map, a method for creating an elevation map, a computer program and a machine-readable storage medium.

BACKGROUND INFORMATION

U.S. Pat. No. 8,825,391 B1 describes a method for creating an elevation map using a laser.

U.S. Pat. No. 11,067,994 B2 describes the creation of an elevation map.

SUMMARY

An object of the present invention is to provide a method for assisting in the creation of an elevation map.

An object of the present invention is also to provide an apparatus for assisting in the creation of an elevation map.

An object of the present invention is also to provide a land vehicle.

An object of the present invention is also to provide a map server for creating an elevation map.

An object of the present invention is also to provide a method for creating an elevation map.

An object of the present invention is also to provide a computer program.

An object of the present invention is also to provide a machine-readable storage medium.

These objects may be achieved by certain features of the present invention. Advantageous example embodiments of the present invention are disclosed herein.

According to one aspect of the present invention, a method for assisting in the creation of an elevation map is provided. According to an example embodiment of the present invention, the method comprises the following steps:

detecting a surroundings of a land vehicle, in particular a motor vehicle or rail vehicle, and ascertaining image data based on the detection by means of a camera of a land vehicle, ascertaining an elevation of a location in the surroundings of the land vehicle relative to a reference location based on the image data, sending the ascertained elevation of the location via a communication network to a remote map server, in order to assist it in the creation of the elevation map.

According to a second aspect of the present invention, an apparatus for assisting in the creation of an elevation map is provided. According to an example embodiment of the present invention, the apparatus comprises:

a camera that is designed to detect a surroundings of a land vehicle, in particular a motor vehicle or rail vehicle, and to ascertain image data based on the detection, an ascertaining device that is designed to ascertain an elevation of a location in the surroundings of the land vehicle relative to a reference location based on the image data, a communication device that is designed to send the ascertained elevation of the location via a communication network to a remote map server, in order to assist it in the creation of the elevation map.

According to a third aspect of the present invention, a land vehicle, in particular a motor vehicle or rail vehicle, is provided, comprising the apparatus according to the second aspect of the present invention.

According to a fourth aspect of the present invention, a map server for creating an elevation map is provided. According to an example embodiment of the present invention, the map server comprises:

a communication device that is designed to receive from a land vehicle, in particular a motor vehicle or rail vehicle, an ascertained elevation of a location in the surroundings of the land vehicle via a communication network, a processor device that is designed to create an elevation map based on the ascertained elevation.

According to a fifth aspect of the present invention, a method for creating an elevation map using the map server according to the fourth aspect is provided. According to an example embodiment of the present invention, the method comprises the following steps:

receiving, by means of the communication device, an ascertained elevation of a location in the surroundings of the land vehicle from the land vehicle, in particular a motor vehicle or rail vehicle, via a communication network, creating an elevation map based on the ascertained elevation by means of the processor device.

According to a sixth aspect of the present invention, a computer program is provided, comprising instructions that, when the computer program is executed by a computer, cause the computer to carry out a method according to a first aspect of the present invention and/or according to the fifth aspect of the present invention.

According to a seventh aspect, a machine-readable storage medium is provided, on which the computer program according to the sixth aspect of the present invention is stored.

The present invention is based on and includes the knowledge that the above objects may be achieved by detecting, on the land vehicle side, a surroundings of the land vehicle using a camera of the land vehicle, wherein, based on the detection, an elevation of a location of the surroundings of the land vehicle is ascertained relative to a reference location. This ascertained elevation is sent from the land vehicle via a communication network to a remote map server, so that it can create an elevation map based on this information. In the related art described above, a laser was used to create an elevation map. In contrast, a camera is cheaper and technically easier to implement. As a rule, today's motor vehicles are already equipped with a camera, for example in order to detect the surroundings for a driver assistance function, such as lane departure warning system. Thus, a camera already installed in the motor vehicle can be used to create the elevation map. A camera already installed in the land vehicle can thus be used efficiently. An additional laser, as used in the related art described above, is therefore not required.

Thus, the elevation of a location in the surroundings of the land vehicle can be efficiently ascertained relative to a reference location on the land vehicle side, so that the map server can be efficiently assisted in the creation of the elevation map, so that the map server can efficiently create the elevation map.

In one example embodiment of the method according to the first aspect of the present invention, it is provided that the elevation of the location is ascertained using the following formula: $e=l*\cos\beta*\tan\alpha$, where e is the elevation of the location, where l is the depth of the location in relation to the video camera, where β is the tilt angle of the camera, where α is the complementary angle to the angle between the horizon and a surface normal at the location for which the elevation is to be ascertained.

As a result, the technical advantage is achieved that the elevation of the location can be ascertained efficiently.

In one example embodiment of the method according to the first aspect of the present invention, it is provided that a current position of the land vehicle is ascertained based on the image data, wherein a data set is ascertained, which comprises the current position of the land vehicle and the ascertained elevation, wherein the data set is sent to the remote map server via the communication network.

As a result, for example, a technical advantage is achieved that the current position of the land vehicle can be ascertained efficiently, wherein by sending the current position to the remote map server, the latter can be efficiently assisted in the creation of the elevation map, insofar as it has additional information, the current position, available for the creation of the elevation map. In particular if the map server receives from a large number of land vehicles a plurality of ascertained elevations and respective current positions of the land vehicle, this additional information can be efficiently used in the creation of the elevation map.

In one example embodiment of the method according to the first aspect of the present invention, it is provided that, based on the image data, a landmark in the surroundings of the land vehicle is recognized, based on which the current position of the land vehicle is ascertained.

As a result, for example, the technical advantage is achieved that the current position of the motor vehicle can be ascertained efficiently.

A landmark is, for example, an infrastructure element such as a traffic signal, traffic sign, building, bridge, streetlight, electricity pylon, pillar or mast. A landmark is, for example, a plant, a tree or a bush.

In one example embodiment of the method according to the first aspect of the present invention, it is provided that a plurality of ascertained elevations from a plurality of locations in the surroundings of the land vehicle relative to the reference location are packed into a data block, which is sent to the remote map server via the communication network.

As a result, for example, the technical advantage is achieved that the ascertained elevations are sent to the remote map server efficiently.

A camera is, for example, a video camera. Image data comprise, for example, video images.

A communication device within the meaning of the description comprises, for example, one or more communication interfaces. A communication interface is, for example, a wireless communication interface or a wired communication interface. A wireless communication interface is, for example, a WLAN interface or a mobile network interface. A wired interface is, for example, an Ethernet interface.

A communication network within the meaning of the description comprises, for example, a wireless communication network, such as a WLAN network, or, for example, a mobile radio network, and/or a wired communication network, such as an Ethernet communication network.

The remote map server is implemented in a Cloud infrastructure, for example.

A land vehicle within the meaning of the description is, for example, one of the following land vehicles: a motor vehicle, such as a passenger car or truck or motorcycle, or a rail vehicle, such as a train, streetcar or rail bus.

A land vehicle is thus a road vehicle, for example, or a rail vehicle, for example.

Statements made in connection with the method according to the first aspect of the present invention apply analogously to the apparatus according to the second aspect of the present invention and to the land vehicle according to the third aspect of the present invention and to the map server according to the fourth aspect of the present invention and to the method according to the fifth aspect of the present invention and vice versa.

This means, therefore, that technical functionalities of the method according to the first aspect of the present invention result from corresponding technical functionalities of the apparatus according to the second aspect of the present invention, of the land vehicle according to the third aspect of the present invention, of the map server according to the fourth aspect of the present invention, and of the method according to the fifth aspect of the present invention, and vice versa.

The embodiments and exemplary embodiment of the present invention disclosed here can be combined with one another in any way, even if this is not explicitly described.

A method within the meaning of the description is, for example, a computer-implemented method.

When the term "map" is used in the description, this is always also to be understood as meaning "elevation map." This means that the elevation map can also simply be referred to as a map.

The present invention is explained in more detail below using preferred exemplary embodiments.

In the following, the same reference signs can be used for identical features.

DETAILED DESCRIPTION OF EXAMPLE EMBODIMENTS

Figure 1:
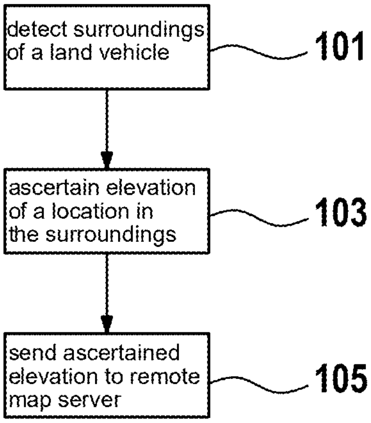
FIG. 1 shows a flow chart of an example method according to the first aspect of the present invention.

FIG. 1 shows a flow chart of a method for assisting in the creation of an elevation map, comprising the following steps: detecting 101 a surroundings of a land vehicle, in particular a motor vehicle or rail vehicle, and ascertaining image data based on the detection by means of a camera of a land vehicle, ascertaining 103 an elevation of a location in the surroundings of the land vehicle relative to a reference location based on the image data, sending 105 the ascertained elevation of the location via a communication network to a remote map server, in order to assist it in the creation of the elevation map.

Figure 2:
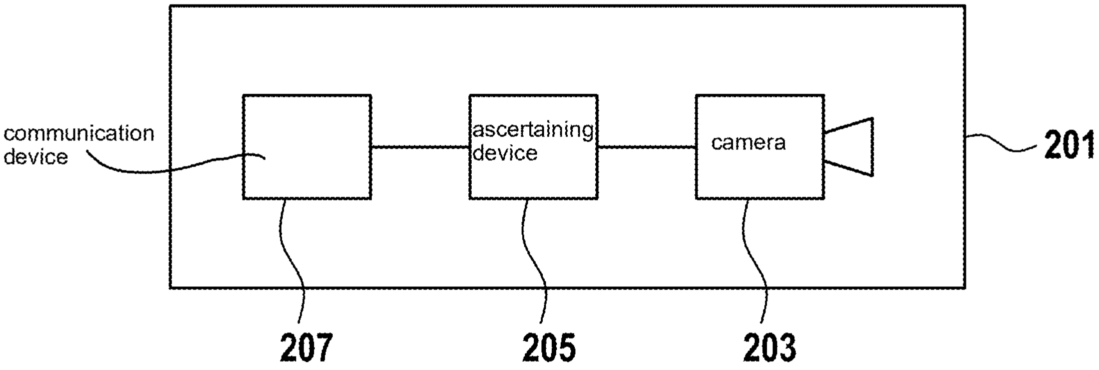
FIG. 2 shows an example apparatus according to the second aspect of the present invention.

FIG. 2 shows an apparatus 201 for assisting in the creation of an elevation map, comprising:

a camera 203 that is designed to detect a surroundings of a land vehicle, in particular a motor vehicle or rail vehicle, and to ascertain image data based on the detection, an ascertaining device 205 that is designed to ascertain an elevation of a location in the surroundings of the land vehicle relative to a reference location based on the image data, a communication device 207 that is designed to send the ascertained elevation of the location via a communication network to a remote map server, in order to assist it in creating the elevation map.

Figure 3:
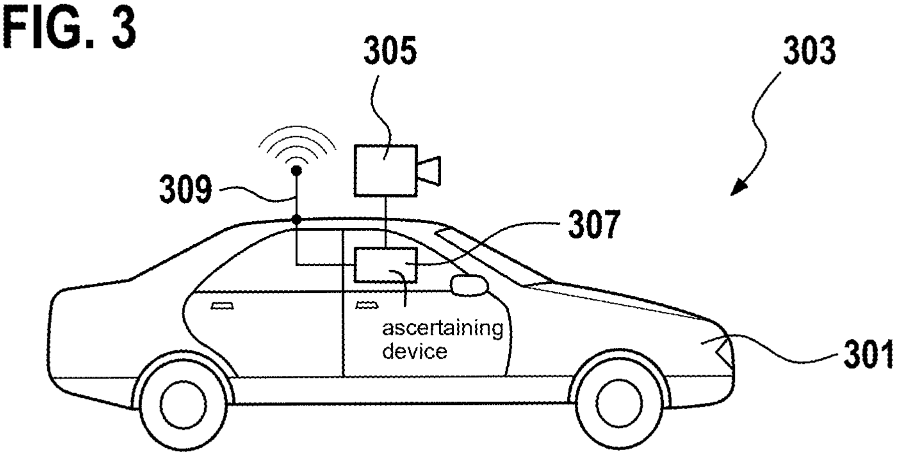
FIG. 3 shows an example land vehicle according to the third aspect of the present invention.

FIG. 3 shows a motor vehicle 301 as an example of a land vehicle within the meaning of the description. The motor vehicle 301 comprises an apparatus 303 for assisting in the creation of an elevation map. The apparatus 303 comprises a camera 305 that is designed to detect a surroundings of the motor vehicle 301 and to ascertain image data based on the detection. Furthermore, the apparatus 303 comprises an ascertaining device that is designed to ascertain an elevation of a location in the surroundings of the motor vehicle 301 relative to a reference location based on the image data. Furthermore, the apparatus 303 comprises a wireless communication interface 309 as an example of a communication device within the meaning of the description, wherein the wireless communication interface 309 is designed to send the ascertained elevation of the location via a communication network to a remote map server, in order to assist it in the creation of the elevation map.

An ascertaining device within the meaning of the description is integrated in the camera, for example. This means, therefore, that according to one embodiment, it can be provided that the camera itself ascertains the elevation of the location in the surroundings of the land vehicle relative to a reference location based on the image data.

In FIGS. 2 and 3, it is shown that the ascertaining device 205 or 307 is shown outside the camera 203 or 305. This is not restrictive. The ascertaining device 205 can be implemented in the camera 203. For example, the ascertaining device 307 can be implemented in the camera 305.

Thus, the step of ascertaining the elevation of a location in the surroundings of the land vehicle relative to a reference location based on the image data can be carried out on the camera side, i.e. internally in the camera.

Figure 4:
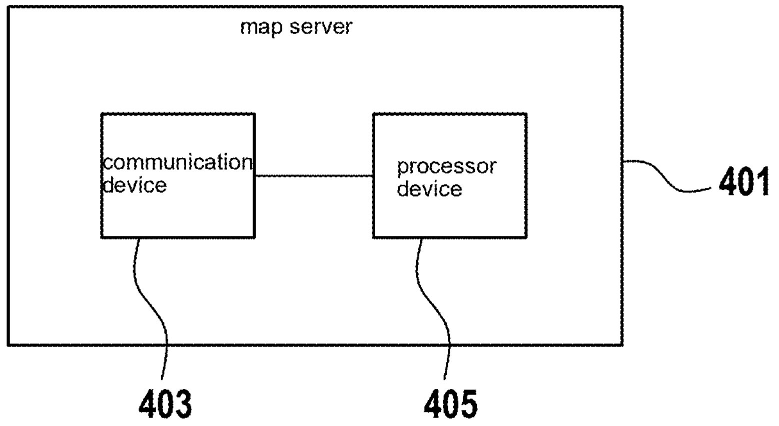
FIG. 4 shows an example map server according to the fourth aspect of the present invention.

FIG. 4 shows a map server 401 for creating an elevation map, comprising:

a communication device 403 that is designed to receive from a land vehicle, in particular a motor vehicle or rail vehicle, an ascertained elevation of a location in the surroundings of the land vehicle relative to a reference location via a communication network, a processor device 405 that is designed to create an elevation map based on the ascertained elevation.

The processor device 405 comprises, for example, one or more processors.

The map server 401, for example, is part of a Cloud infrastructure, which can simply be abbreviated as Cloud.

Figure 5:
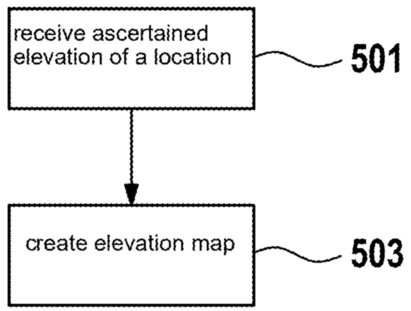
FIG. 5 shows a flow chart of an example method according to the fifth aspect of the present invention.

FIG. 5 shows a flow chart of a method for creating an elevation map using the map server according to the fourth aspect, comprising the following steps:

receiving 501, by means of the communication device, an ascertained elevation of a location in the surroundings of the land vehicle relative to a reference location from the land vehicle, in particular a motor vehicle or rail vehicle, via a communication network, creating 503 an elevation map based on the ascertained elevation by means of the processor device.

Figure 6:
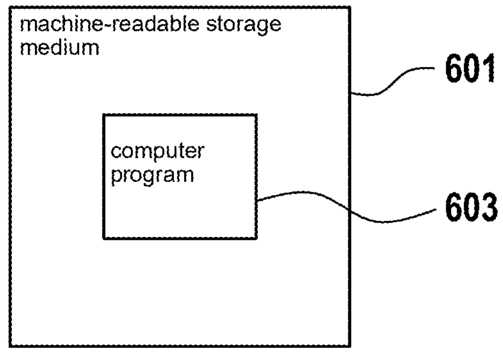
FIG. 6 shows an example machine-readable storage medium according to the seventh aspect of the present invention.

FIG. 6 shows a machine-readable storage medium 601 on which a computer program 603 is stored. The computer program 603 comprises instructions that, when the computer program 603 is executed by a computer, cause said computer to carry out a method according to the first aspect and/or according to the fifth aspect.

The apparatus according to the second aspect is, for example, programmatically configured to execute the computer program according to the sixth aspect in the embodiment in which the computer program comprises instructions that, when the computer program is executed by a computer, cause the computer to carry out a method according to the first aspect.

For example, the map server is programmatically configured to execute the computer program according to the sixth aspect if, in one embodiment, the computer program comprises instructions that, when the computer program is executed by a computer, cause the computer to carry out a method according to the fifth aspect.

This means, for example, that the computer program is or can be executed on the apparatus according to the second aspect if the computer program comprises instructions that, when the computer program is executed by a computer, cause the computer to carry out a method according to the first aspect.

For example, the computer program can be executed or is executed by the map server, provided that the computer program comprises instructions that, when the computer program is executed by a computer, cause the computer to carry out a method according to the fifth aspect.

Figure 7:
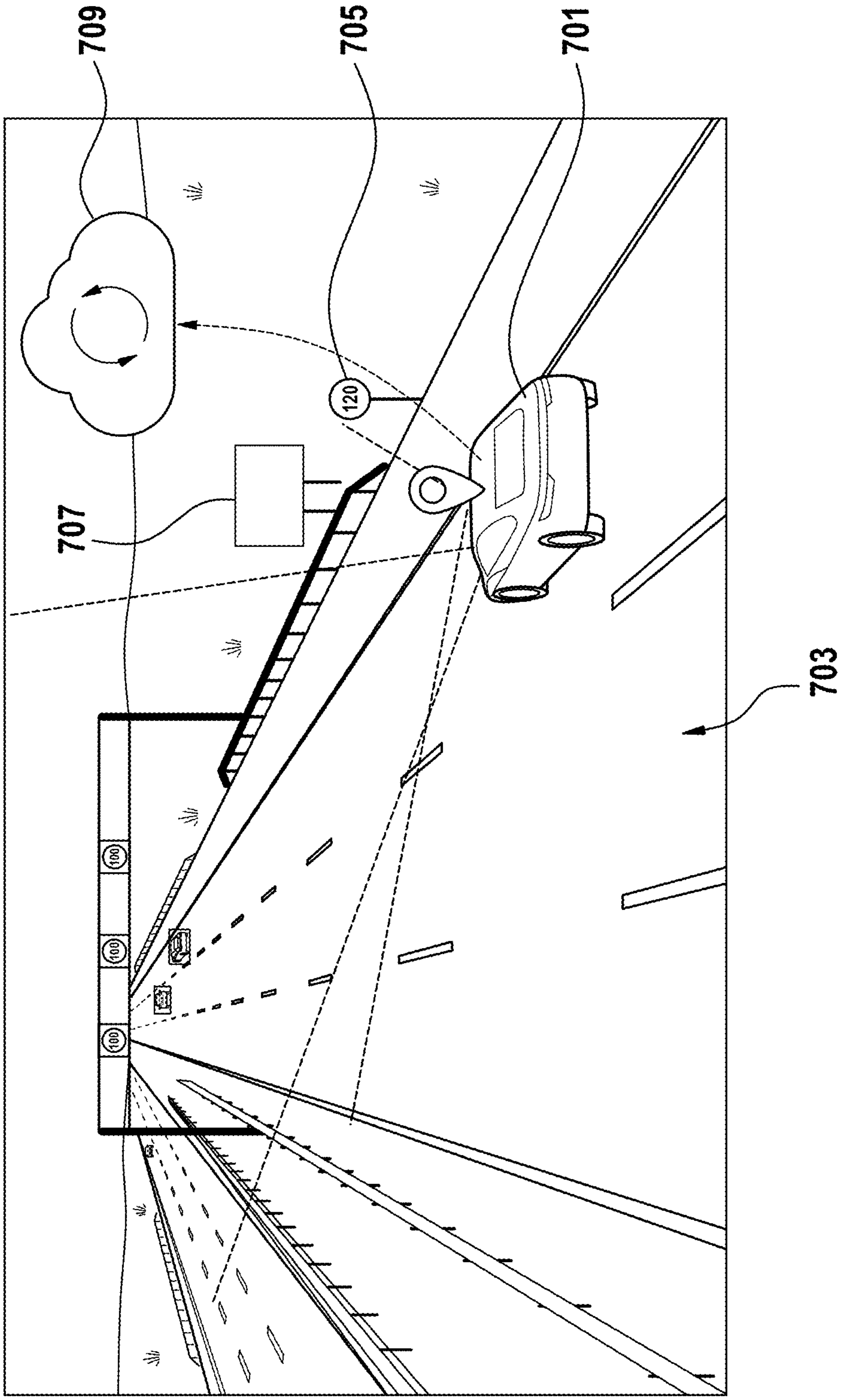
FIG. 7 shows a motor vehicle driving on a multi-lane highway.

FIG. 7 shows a motor vehicle 701 driving on a multi-lane highway 703. The motor vehicle 701 comprises an apparatus according to the second aspect, which is not shown for the sake of clarity. The motor vehicle 701 detects its environment using the camera. Exemplary landmarks 705, 707 are located on the right-hand edge of the highway 703 in relation to the direction of travel of the motor vehicle 701. For example, the landmark 705 is a speed limit sign. The landmark 707 can, for example, be an electronic traffic sign that can display traffic information.

According to the concept described here, the motor vehicle 701 can ascertain an elevation of a location in the surroundings of the land vehicle relative to a reference location, and send this information to a Cloud 709, in which a map server according to the fifth aspect is implemented.

Figure 8:
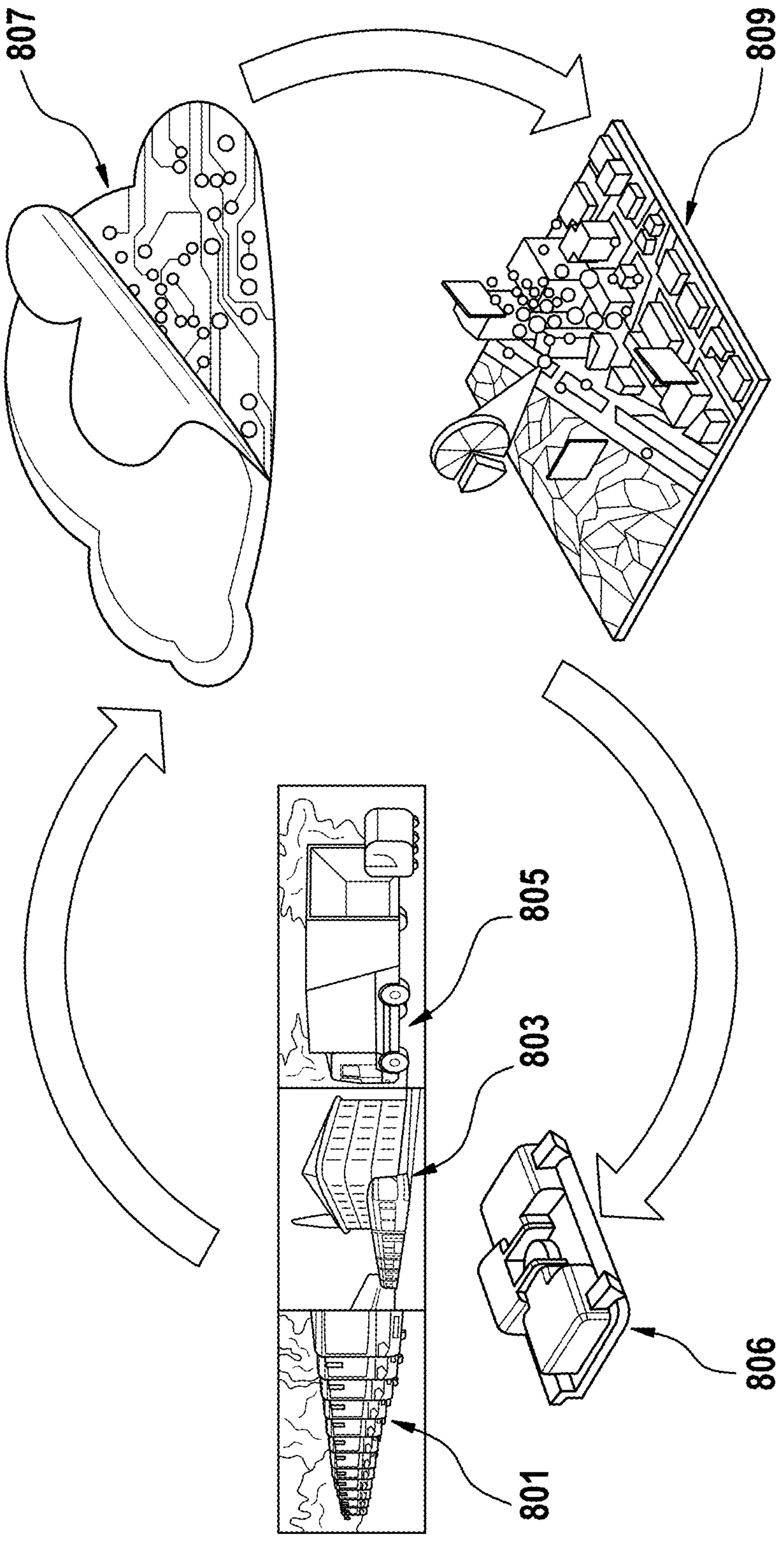
FIG. 8 shows an exemplary implementation of the concept according to the present invention described here for creating an elevation map or for assisting in the creation of an elevation map.

FIG. 8 shows an exemplary implementation of the concept described here.

A plurality of buses 801, a streetcar 803 and a truck 805 in the form of a garbage truck are shown. All of these vehicles are land vehicles within the meaning of the description and can, for example, be equipped with an apparatus according to the second aspect, so that they can efficiently assist a remote map server in the creation of an elevation map. Said land vehicles 801, 803, 805 can send the corresponding ascertained elevations to a Cloud 807, in which a map server can be implemented. The data or information received by the Cloud 807 can, for example, be further processed in an artificial intelligence system 809, in order to create the elevation map. The elevation map can then be sent back from the Cloud 807 to the land vehicles 801, 803, 805. They can use this elevation map to carry out the method according to the first aspect.

The land vehicles 801, 803, 805 comprise a camera 809 in order to detect their respective surroundings, as described above and/or below, in order to thus ascertain the elevation of a location in the surroundings relative to a reference location.

Figure 9:
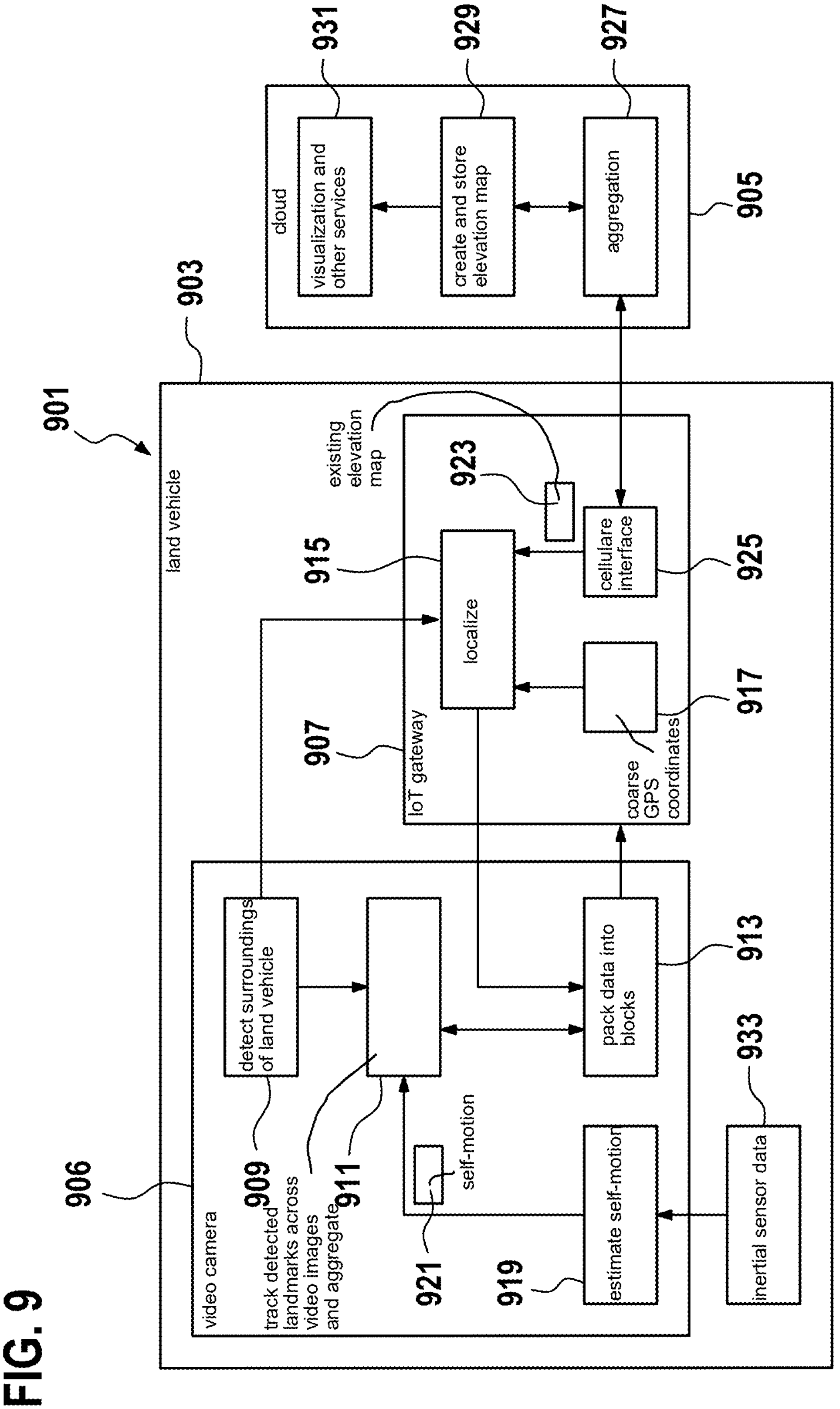
FIG. 9 shows a first block diagram, according to an example embodiment of the present invention.

FIG. 9 shows a first block diagram 901, which is intended to explain the concept described here by way of example.

According to the first block diagram 901, a land vehicle 903 and a Cloud 905 are provided, in which a map server is implemented.

The land vehicle 903 comprises a video camera 906 and an IoT gateway 907 (IoT stands for Internet of Things).

According to a detection function block 909, the surroundings of the land vehicle 903 is detected so that, for example, an angle of the road surface can be ascertained and, for example, landmarks such as road markings or road edges, which are required for calculating the elevation of the location relative to a reference location, are also detected.

According to a time aggregation function block 911, the detected landmarks are tracked across the video images and the detections from the video images are aggregated into an average, which increases an accuracy and reduces a communication bandwidth to the Cloud.

According to a mapping function block 913, the data are packed into blocks and sent to the IoT gateway 907. In addition, according to the mapping function block 913, an existing elevation map (reference map) 923 is used, so that already-mapped landmarks are known and can be used for the detection of the corresponding landmarks in the video images.

A localization function block 915 uses coarse GPS coordinates 917, a self-motion 921 of the land vehicle estimated by means of a self-motion function block 919, the reference map 921 received from the Cloud 905 via a cellular interface 925, in particular an LTE interface, and the video images ascertained by the detection function block 909, in order to accurately localize the ego-vehicle (the land vehicle) in a global map.

The Cloud 905 carries out an aggregation 927 of the data (ascertained elevations of the locations) from all land vehicles equipped with the apparatus according to the second aspect, in order to create an elevation map.

The aggregation comprises, for example, a mapping. The elevation map created is stored, for example, in accordance with a function block 929, in order to use said map, for example, for a visualization and other services according to a function block 931.

The self-motion function block 919 is supplied with inertial sensor data 933 from inertial sensors of the land vehicle, based on which the self-motion 921 can be estimated.

Figure 10:
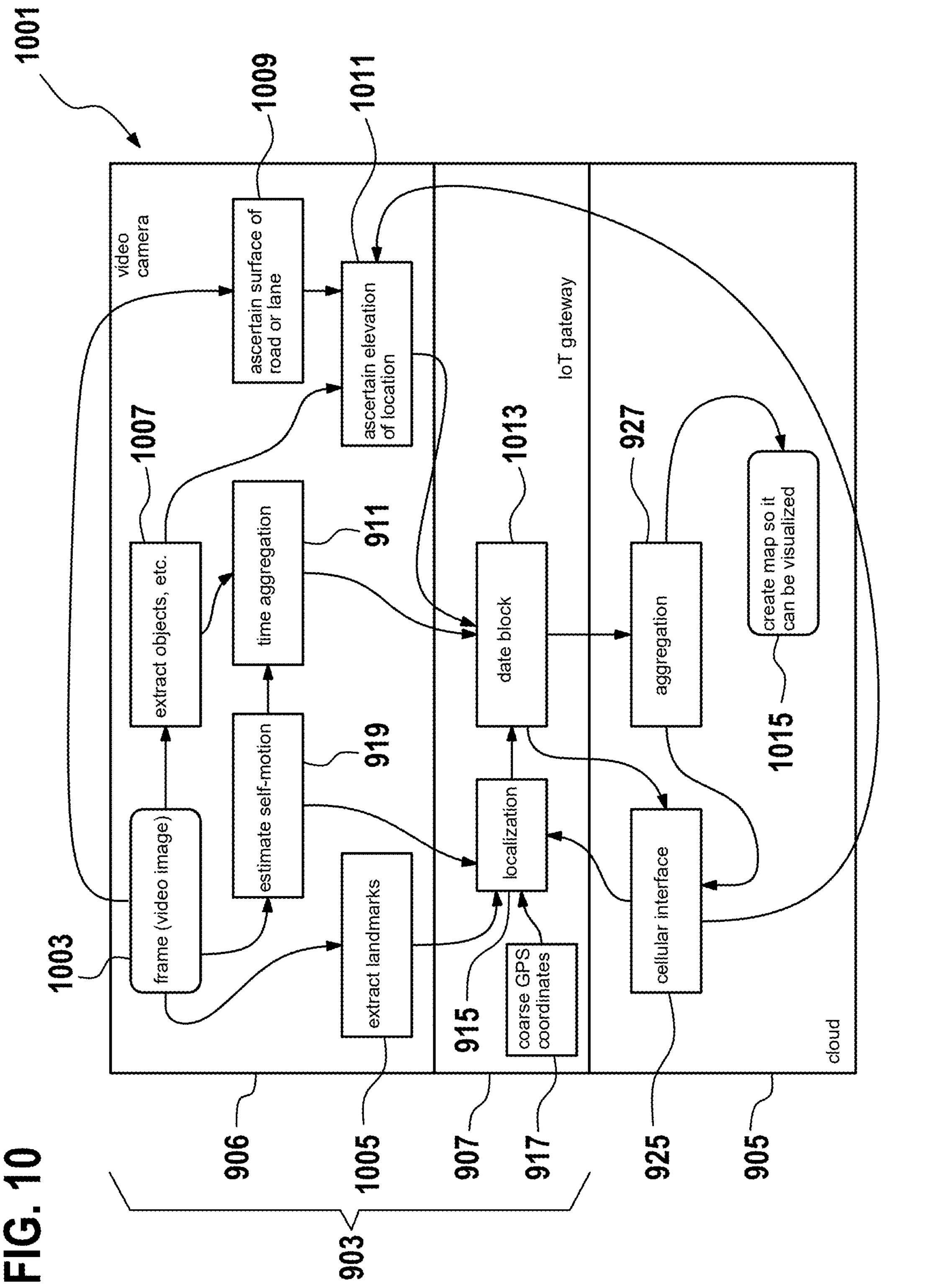
FIG. 10 shows a second block diagram according to an example embodiment of the present invention.

FIG. 10 shows a second block diagram 1001, which is based on the first block diagram 901.

The reference sign 1003 indicates a frame, i.e. a video image from the video camera 906, which is used by the self-motion function block 919. Landmarks for localization are extracted from the video image 1003 in accordance with a function block 1005. In general, information 1003, for example: objects, landmarks, vehicles, pedestrians, cyclists, can be extracted from the video image 1007.

Based on the video image 1003, the surface of the road or lane is ascertained according to a function block 1009. Based on this, an elevation of a location in the surroundings of the land vehicle 903 relative to a reference location is ascertained according to a function block 1011.

The ascertained elevation is packed with the current position of the land vehicle 903 to form a data block 1013, which is sent to the Cloud 905. There, the data blocks sent by a large number of land vehicles are aggregated in an existing elevation map. The elevation map created in this way can be visualized in accordance with a function block 1015, for example.

Figure 11:
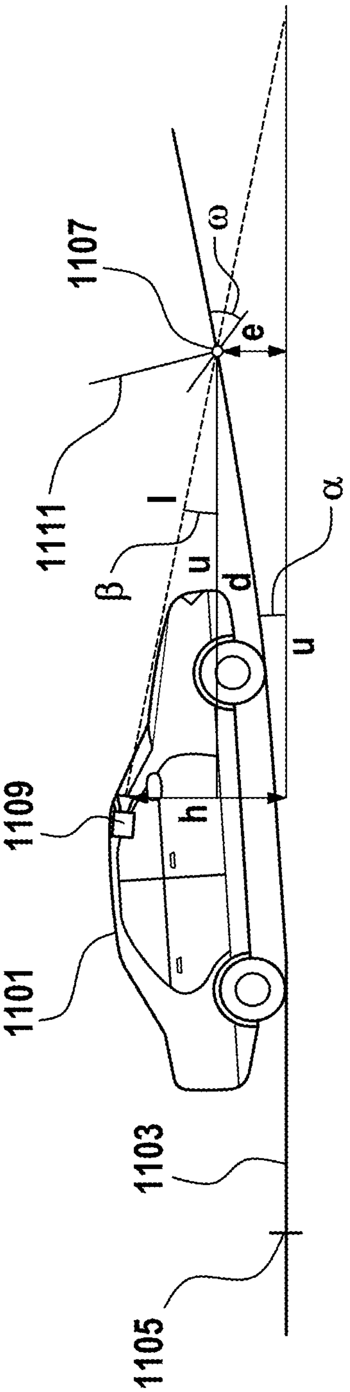
FIG. 11-13 each show a motor vehicle driving on a road.

FIG. 11 shows a motor vehicle 1101 that is traveling on a road 1103. A reference location on the road 1103 is identified with the reference sign 1105. A location for which the elevation is to be ascertained is identified with the reference sign 1107. The vehicle 1101 comprises a camera 1109 that can detect a region in front of the motor vehicle 1101. Using the image data from the camera 1109, the elevation e of the location 1107 relative to the reference location 1105 can be ascertained as follows, for example:

$$\left.\begin{array}{l}\sin(\alpha)=\dfrac{e}{d}\Rightarrow e=d\cdot\sin(\alpha)\\ \left.\begin{array}{l}\cos(\alpha)=\dfrac{u}{d}\Rightarrow d=\dfrac{u}{\cos(\alpha)}\\ \cos(\beta)=\dfrac{u}{\ell}\Rightarrow u=\ell\cdot\cos(\beta)\end{array}\right\}\Rightarrow d=\dfrac{\ell\cdot\cos(\beta)}{\cos(\alpha)}\end{array}\right\}\Rightarrow e=\dfrac{\ell\cdot\cos(\beta)}{\cos(\alpha)}\cdot\sin(\alpha)\Rightarrow e=\ell\cdot\cos(\beta)\cdot tg(\alpha) \quad (1)$$

Here, e designates the elevation of the location 1107 in relation to the reference location 1105. l is the depth of the location in relation to the camera 1109. β is the tilt angle of the camera. α is the complementary angle to the angle between the horizon and a surface normal 1111 at the location 1107.

Figure 12:
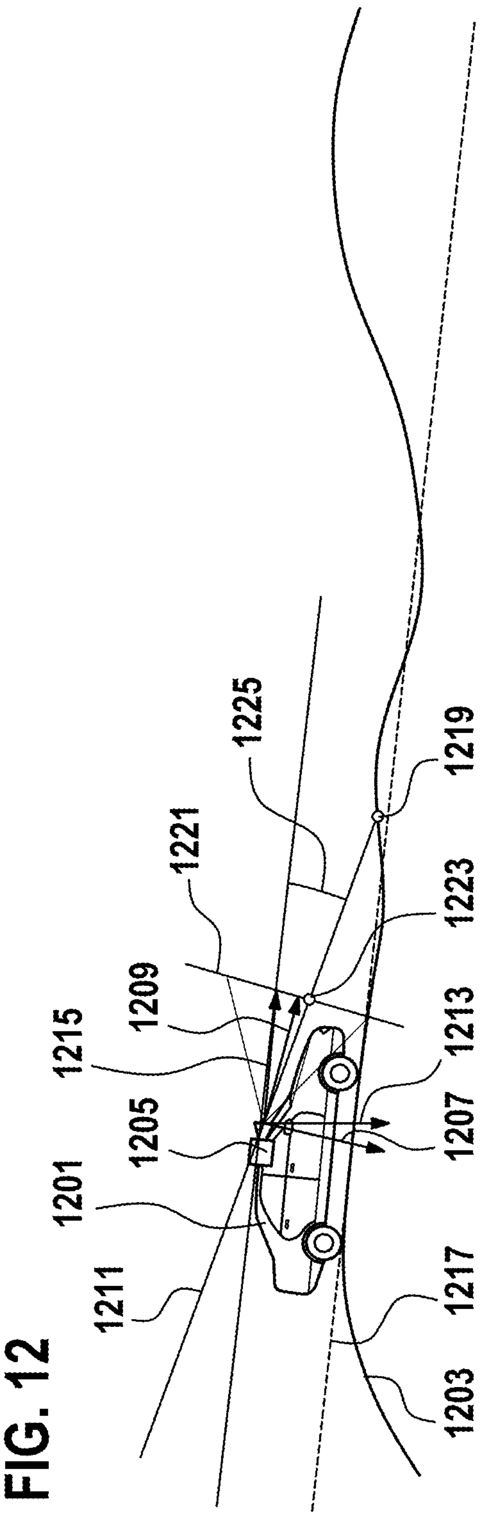

FIG. 12 shows a further motor vehicle 1201 that is traveling on a road 1203. The motor vehicle 1201 comprises a camera 1205. The reference sign 1207 indicates a y-axis of a camera coordinate system. The reference sign 1209 indicates a z-axis of the camera coordinate system, wherein the z-axis 1209 is co-linear to the optical axis 1211 of the camera 1205.

The reference sign 1213 indicates a y-axis of a road coordinate system. The reference sign 1215 indicates a z-axis of the road coordinate system. Here, the z-axis 1215 is parallel to the tangent 1217 at the present or current position of the motor vehicle 1201.

Reference sign 1219 identifies a location for which the elevation is to be ascertained.

Reference sign 1221 identifies a virtual image plane. Reference sign 1223 identifies a pixel of the location 1219 in the virtual image plane 1221.

Reference sign 1225 identifies an angle between the optical axis 1211 or the z-axis 1209 of the camera coordinate system and the z-axis 1215 of the road coordinate system. This angle 1225 is the tilt angle of the camera.

Figure 13:
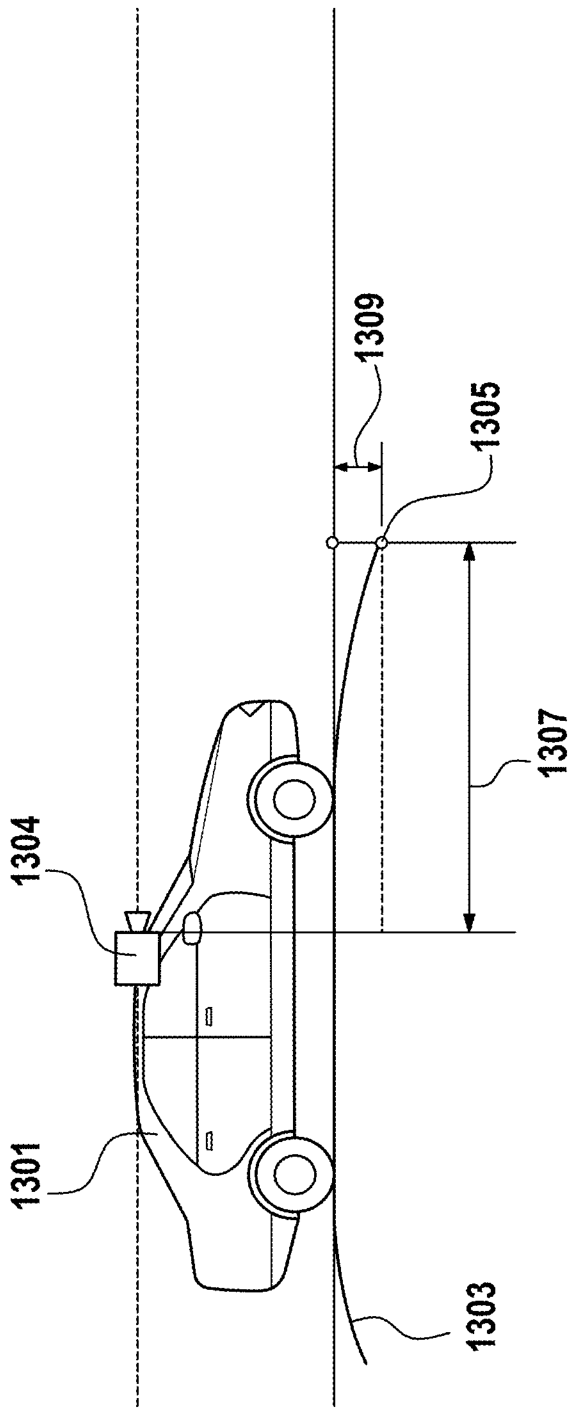

FIG. 13 shows a further motor vehicle 1301 that is traveling on a road 1303. The motor vehicle 1301 comprises a camera 1304. A location for which the elevation is to be ascertained is identified by the reference sign 1305 and is below a current elevation of the motor vehicle 1301. Thus, in this case, the elevation in relation to the current position of the motor vehicle 1301 is negative. Reference sign 1307 identifies a distance between the camera 1304 and the location 1305. Reference sign 1309 identifies the elevation of the location 1305 in relation to the current position of the motor vehicle 1301, which is therefore a reference location. The distance 1307 can be 10 m, for example.

The vehicles equipped with the apparatus drive through a city, for example, and ascertain the local elevation, for example. They report their own position cyclically via precise localization, so that the elevation can be integrated into an existing elevation map in the Cloud as a global elevation.

For example, an "object/landmark detection" function block identifies relevant map elements (e.g., road markings, road signs, poles, etc.) that are useful for saving in an HD map (HD: high definition). The map is then used, for example, for autonomous driving, map services (e.g., information about wrong-way drivers, hazards) or smart city management (e.g., elevation maps, traffic density, etc.). The map is also one of the 2 inputs for the localization function block.

The localization function block is a function block that can run on the video camera or the IoT gateway. The localization problem is part of SLAM (simultaneous localization and mapping). The initial approximate position is used by a GPS input. For example, an existing map (consisting of landmarks that have already been measured by a plurality of vehicles on a large number of journeys) and online observations (landmarks that were recognized at the time of the journey) are used. For example, the exact position of the vehicle is ascertained from the overlap of these two inputs.

Self-motion estimation precisely detects the 6DOF (DOF: degree of freedom) for the vehicle's self-motion. This is used for trajectory estimation, cross frame tracking, etc.

In short, a vehicle driving on a road can use the optical flow to estimate the elevation profile of the road surface. In the form of a function s (z). This means that the elevation e can be ascertained at any point along the road. For example, z=10 m. This elevation estimate is the result of multiple image measurements and cross-image tracking and has a high degree of accuracy.

The local elevation calculation block reads out the elevation value at the depth z(10) per meter. The distance traveled comes from the self-motion estimation (for example, from a fusion of optical motion recognition and vehicle CAN inputs from other sensors).

In accordance with a data packing function block, a plurality of elevation measurements and their corresponding position, which originate from the localization function block, can be packed together in larger data blocks (e.g., 4 kBytes).

Aggregating and integrating this information into an existing elevation map ensures alignment between a plurality of journeys on the same road and the inclusion of new elevation values.

The problem of alignment during a plurality of journeys is solved in connection with the creation of HD maps for autonomous driving. In short, a plurality of road graphs are coordinated using PGOs (pose graph optimization).

For example, the new elevation value will contribute to the existing values in a weighted manner. The removal of outliers in the elevation map can also be implemented.

For example, a land vehicle is equipped with a front camera, by means of which an environment or surroundings of the land vehicle can be detected and analyzed within the land vehicle in order to understand the surroundings, for example by using different techniques in parallel (e.g., traditional computer vision, machine learning, deep neural networks, optical flow and structure from motion). This ensures safety through freedom from interference along with higher recognition performance and stability. The recognition performance and, above all, the wide range of options for measuring the environment provide versatility. (a plurality of types of data can be accurately detected using the same sensor).

Some of the recognitions of static or dynamic objects are worth saving in an offline HD map and storing in a Cloud. Recognized or detected objects that are static or permanent are referred to as landmarks (e.g., road signs, poles, road markings, etc.). Detected objects that are dynamic or temporary are referred to as objects (e.g., vehicles, pedestrians, etc.).

The resulting map can be used in two ways, for example: for autonomous or at least highly automated motor vehicles or for smart cities. For the use case of motor vehicles, the map is sent to motor vehicles once it has been created. In addition to detecting the surroundings using the camera, the map can be used as a redundant path for understanding the scene. In addition, the map can be used as an electronic horizon that allows one to see beyond the physical field of vision (bend, intersection, occlusion . . . ). This increases the degree of autonomy of such motor vehicles.

The second use case, in which the map is used for smart cities, also incorporates the concept described here. For example, a camera can be installed in urban vehicle fleets (e.g., buses, streetcars or garbage trucks), in order to create a comprehensive live HD map of the city. This approach offers a high degree of flexibility and coverage.

The data measured by the camera are sent to the backend or the remote map server via an over-the-air communication control device (IoT gateway), for example.

The concept described here comprises, in particular, measuring the elevation of the roads. The measurements are taken relative to a reference starting position (reference location), for example. The land vehicles equipped with the apparatus according to the second aspect can send this elevation delta together with their current position to the Cloud or remote map server, where a global elevation map is created. The elevation map can be used as a cadastral map.

What is claimed is:

1. A method for assisting in creation of an elevation map, the method comprising, during travel of a land vehicle, which is one of a plurality of vehicles, through an environment, performing the following steps:

for each of a plurality of positions of the land vehicle in the environment over time:

detecting surroundings of the land vehicle, the detecting including ascertaining image data representing the surroundings using a camera of the land vehicle;

sensing a motion state of the land vehicle including a change in an orientation of the camera relative to a baseline horizontal reference level;

determining, based on the image data and the sensed motion state of the land vehicle, a line-of-sight distance from the camera to a location in the surroundings and geometric parameters including a camera tilt angle and a surface-related angle associated with the location; and determining a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location;

generating an averaged elevation determination for the location based on the elevations determined at the plurality of positions over time; and wirelessly transmitting the averaged elevation determination via a communication network from the land vehicle to a remote map server configured to generate the elevation map based on elevation determinations received from the plurality of vehicles, wherein the remote map server is configured to aggregate elevation determinations received from the plurality of vehicles, identify and remove outlier elevation determinations from the aggregated elevation determinations, and generate the elevation map based on the aggregated elevation determinations.

2. The method according to claim 1, wherein the land vehicle is a motor vehicle or a rail vehicle.

3. The method according to claim 1, wherein the respective elevations of the location are ascertained using the following formula:

$e=l*\cos\beta*\tan\alpha$, where e represents the elevation of the location, where l is a depth of the location in relation to the camera, where $\beta$ is the tilt angle of the camera, where $\alpha$ is surface-related angle, the surface-related angle being a complementary angle to an angle between the horizon and a surface normal at the location for which the elevation is being ascertained.

4. The method according to claim 1 wherein a current position of the land vehicle is ascertained based on the image data, wherein a data set is ascertained which includes the current position of the land vehicle and the averaged elevation determination, wherein the data set is sent to the remote map server via the communication network.

5. The method according to claim 4, wherein, based on the image data, a landmark in the surroundings of the land vehicle is recognized, based on which the current position of the land vehicle is ascertained.

6. The method according to claim 1, wherein a plurality of averaged elevation determinations for a plurality of locations in the surroundings of the land vehicle relative to the reference location are packed into a data block, which is sent to the remote map server via the communication network.

7. An apparatus of a land vehicle, which is one of a plurality of vehicles, the apparatus being configured to assist in creation of an elevation map during travel of a land vehicle, which is one of a plurality of vehicles, through an environment, the apparatus comprising:

a camera;

a processing system that includes at least one processor; and a communication device;

wherein, during travel of the land vehicle through an environment, the processing system is configured to:

for each of a plurality of positions of the land vehicle in the environment over time:

use the camera to detect surroundings of land vehicle, the detection including ascertaining image data representing the surroundings sense a motion state of the land vehicle including a change in an orientation of the camera relative to a baseline horizontal reference level;

determine, based on the image data and the sensed motion state of the land vehicle, a line-of-sight distance from the camera to a location in the surroundings and geometric parameters including a camera tilt angle and a surface-related angle associated with the location; and determine a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location;

generate an averaged elevation determination for the location based on the elevations determined at the plurality of positions over time; and use the communication device to wirelessly transmit the averaged elevation determination via a communication network from the land vehicle to a remote map server configured to generate the elevation map based on elevation determinations received from the plurality of vehicles, wherein the remote map server is configured to aggregate elevation determinations received from the plurality of vehicles, identify and remove outlier elevation determinations from the aggregated elevation determinations, and generate the elevation map based on the aggregated elevation determinations.

8. A land vehicle, which is one of a plurality of vehicles, the land vehicle comprising:

an apparatus configured to assist in creation of an elevation map during travel of a land vehicle, which is one of a plurality of vehicles, through an environment, the apparatus including a camera, a processing system that includes at least one processor, and a communication device;

wherein, during travel of the land vehicle through an environment, the processing system is configured to;

for each of a plurality of positions of the land vehicle in the environment over time:

use the camera to detect surroundings of land vehicle, the detection including ascertaining image data representing the surroundings;

sense a motion state of the land vehicle including a change in an orientation of the camera relative to a baseline horizontal reference level;

determine, based on the image data and the sensed motion state of the land vehicle, a line-of-sight distance from the camera to a location in the surroundings and geometric parameters including a camera tilt angle and a surface-related angle associated with the location; and determine a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location;

generate an averaged elevation determination for the location based on the elevations determined at the plurality of positions over time; and use the communication device to wirelessly transmit the averaged elevation determination via a communication network from the land vehicle to a remote map server configured to assist generate the elevation map based on elevation determinations received from the plurality of vehicles, wherein the remote map server is configured to aggregate elevation determinations received from the plurality of vehicles, identify and remove outlier elevation determinations from the aggregated elevation determinations, and generate the elevation map based on the aggregated elevation determinations.

9. A map server comprising:

a communication device; and a processor system that includes at least one processor, wherein the processor system is configured to:

wirelessly receive, using the communication device and via a communication network, a plurality of averaged elevation determinations over time from a plurality of land vehicles that are each configured to generate a respective one of the averaged elevation determinations by:

during travel of the respective land vehicle through an environment and for each of a plurality of positions of the respective land vehicle in the environment over time:

detecting surroundings of the respective land vehicle using a camera of the respective land vehicle and ascertaining image data representing the surroundings;

sensing a motion state of the respective land vehicle including a change in an orientation of the camera relative to a baseline horizontal reference level;

determining, based on the image data and the sensed motion state, a line-of-sight distance from the camera to a location in the surroundings and geometric parameters including a camera tilt angle and a surface-related angle associated with the location; and determining a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location; and generating the respective averaged elevation determination for the location based on the elevations determined at the plurality of positions over time;

aggregate the averaged elevation determinations received from the plurality of land vehicles;

identify and remove outlier elevation determinations from the aggregated elevation determinations; and generate an elevation map based on remaining ones of the aggregated elevation determinations.

10. A method for creating an elevation map using a map server, the method comprising the following steps:

wirelessly receiving, using a communication device of the map server and via a communication network, a plurality of averaged elevation determinations over time from a plurality of land vehicles that are each configured to generate a respective one of the averaged elevation determinations by:

during travel of the respective land vehicle through an environment and for each of a plurality of positions of the respective land vehicle in the environment over time:

detecting surroundings of the respective land vehicle using a camera of the respective land vehicle and ascertaining image data representing the surroundings;

sensing a motion state of the respective land vehicle including a change in an orientation of the camera relative to a baseline horizontal reference level;

determining, based on the image data and the sensed motion state, a line-of-sight distance from the camera to a location in the surroundings and geometric parameters including a camera tilt angle and a surface-related angle associated with the location; and determining a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location; and generating the respective averaged elevation determination for the location based on the elevations determined at the plurality of positions over time;

aggregating, using a processor of the map server, the averaged elevation determinations received from the plurality of land vehicles;

identifying and removing, using the processor, outlier elevation determinations from the aggregated elevation determinations; and generating, using the processor, the elevation map based on remaining ones of the aggregated elevation determinations.

11. A non-transitory machine-readable storage medium on which is stored a computer program for assisting in creation of an elevation map, the computer program, when executed by a computer of a land vehicle, which is one of a plurality of land vehicles, causing the computer to perform the following steps during travel of the land vehicle through an environment:

for each of a plurality of positions of the land vehicle in the environment over time:

detecting surroundings of the land vehicle, the detecting including ascertaining image data representing the surroundings using a camera of the land vehicle;

sensing a motion state of the land vehicle including a change in an orientation of the camera relative to a baseline horizontal reference level;

determining, based on the image data and the sensed motion state of the land vehicle, a line-of-sight distance from the camera to a location in the surroundings and geometric parameters including a camera tilt angle and a surface-related angle associated with the location; and determining a respective elevation of the location relative to a reference location by compensating for the changing orientation of the camera relative to the baseline horizontal reference level and calculating the elevation using a geometric relationship based on the line-of-sight distance and the geometric parameters including both (i) the camera tilt angle relative to the baseline horizontal reference level and (ii) the surface-related angle associated with the location;

generating an averaged elevation determination for the location based on the elevations determined at the plurality of positions over time; and wirelessly transmitting the averaged elevation determination via a communication network from the land vehicle to a remote map server configured to generate the elevation map based on elevation determinations received from the plurality of vehicles, wherein the remote map server is configured to aggregate elevation determinations received from the plurality of vehicles, identify and remove outlier elevation determinations from the aggregated elevation determinations, and generate the elevation map based on the aggregated elevation determinations.

* * * * *